United States Patent
Tan (10) Patent No.: US 9,817,442 B2
(45) Date of Patent: Nov. 14, 2017

(54) SYSTEMS AND METHODS FOR PRESENTING VISUAL INTERFACE CONTENT

(75) Inventor: Min-Liang Tan, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 240 days.

(21) Appl. No.: 13/407,713

(22) Filed: Feb. 28, 2012

(65) Prior Publication Data

US 2013/0222273 A1    Aug. 29, 2013

(51) Int. Cl.
| | |
|---|---|
| G06F 3/041 | (2006.01) |
| G09G 3/36 | (2006.01) |
| G09G 5/00 | (2006.01) |
| G06F 1/16 | (2006.01) |
| A63F 13/26 | (2014.01) |

(52) U.S. Cl.
CPC .......... *G06F 1/1643* (2013.01); *G06F 1/1626* (2013.01); *A63F 13/26* (2014.09); *A63F 2300/1043* (2013.01); *A63F 2300/301* (2013.01)

(58) Field of Classification Search
CPC ... G06F 3/041; G06F 3/02; G06F 3/14; G06F 3/048
See application file for complete search history.

(56) References Cited

U.S. PATENT DOCUMENTS

| | | | |
|---|---|---|---|
| 6,034,717 A * | 3/2000 | Dentinger et al. | 348/51 |
| 6,643,124 B1 * | 11/2003 | Wilk | 361/679.04 |
| 6,859,219 B1 * | 2/2005 | Sall | 345/1.1 |
| 7,347,780 B1 * | 3/2008 | Best | 463/37 |
| 7,620,901 B2 * | 11/2009 | Carpenter et al. | 715/754 |
| 8,075,401 B2 * | 12/2011 | Miyamoto et al. | 463/37 |
| 8,150,463 B2 * | 4/2012 | Karnalkar et al. | 455/557 |
| 8,378,932 B2 * | 2/2013 | Fein et al. | 345/76 |
| 8,517,837 B2 * | 8/2013 | Tiley et al. | 463/37 |
| 2004/0203604 A1 * | 10/2004 | Pugliese | 455/411 |
| 2004/0257337 A1 * | 12/2004 | Shibamiya et al. | 345/156 |
| 2005/0088463 A1 * | 4/2005 | Schilling | 345/699 |
| 2005/0099361 A1 * | 5/2005 | Majer | 345/1.3 |

(Continued)

FOREIGN PATENT DOCUMENTS

| | | |
|---|---|---|
| CN | 1818986 A | 8/2006 |
| CN | 201698396 U | 1/2011 |

(Continued)

OTHER PUBLICATIONS

"International Search Report dated May 27, 2013," International Application No. PCT/SG2013/000067, 3 pages.

(Continued)

*Primary Examiner* — Bryan Earles
(74) *Attorney, Agent, or Firm* — Polsinelli PC (57) ABSTRACT

A method for presenting visual interface content comprising adjunct visual interface content during application program execution, and the adjunct visual interface content provides visual information associated with application program execution. The method comprising displaying the adjunct visual interface content using a first interface, displaying the adjunct visual interface content using a second interface, and displaying the updated adjunct visual interface content on the at least one of the first and second interfaces based on actuation of the first and second interfaces.

52 Claims, 1 Drawing Sheet

(56) References Cited

U.S. PATENT DOCUMENTS

| | | | |
|---|---|---|---|
| 2005/0134524 A1* | 6/2005 | Parker et al. | 345/1.1 |
| 2005/0248501 A1* | 11/2005 | Kim | 345/1.1 |
| 2006/0034042 A1* | 2/2006 | Hisano et al. | 361/681 |
| 2006/0067654 A1* | 3/2006 | Herberger et al. | 386/120 |
| 2006/0205517 A1 | 9/2006 | Malabuyo et al. | |
| 2008/0092087 A1* | 4/2008 | Brown et al. | 715/863 |
| 2008/0113802 A1* | 5/2008 | Johnson et al. | 463/40 |
| 2009/0176571 A1* | 7/2009 | Sternberg | 463/36 |
| 2010/0039350 A1* | 2/2010 | Wakefield et al. | 345/1.3 |
| 2010/0064228 A1* | 3/2010 | Tsern | 715/740 |
| 2010/0085274 A1* | 4/2010 | Kilpatrick et al. | 345/1.3 |
| 2010/0138780 A1* | 6/2010 | Marano et al. | 715/804 |
| 2010/0157518 A1* | 6/2010 | Ladouceur et al. | 361/679.09 |
| 2010/0246119 A1* | 9/2010 | Collopy et al. | 361/679.55 |
| 2010/0257475 A1* | 10/2010 | Smith et al. | 715/771 |
| 2010/0259482 A1* | 10/2010 | Ball | G06F 3/0219 345/168 |
| 2010/0279769 A1* | 11/2010 | Kidakarn | 463/31 |
| 2010/0281410 A1* | 11/2010 | Heintze | G06F 3/0202 715/769 |
| 2010/0293056 A1 | 11/2010 | Flynt et al. | |
| 2010/0304792 A1* | 12/2010 | Li | H04B 1/3877 455/566 |
| 2010/0331082 A1* | 12/2010 | Kim et al. | 463/30 |
| 2011/0006971 A1 | 1/2011 | Ebey et al. | |
| 2011/0210922 A1* | 9/2011 | Griffin | 345/173 |
| 2011/0252380 A1 | 10/2011 | Chaudhri | |
| 2011/0260976 A1* | 10/2011 | Larsen et al. | 345/168 |
| 2011/0261269 A1* | 10/2011 | Khan | G06F 1/1626 348/734 |
| 2011/0268487 A1 | 11/2011 | Larsen | |
| 2011/0310030 A1* | 12/2011 | Mundt et al. | 345/173 |
| 2011/0314405 A1* | 12/2011 | Turner | G06F 3/0238 715/773 |
| 2012/0026118 A1* | 2/2012 | Hackborn | G06F 3/03547 345/173 |
| 2012/0169623 A1* | 7/2012 | Grossman et al. | 345/173 |
| 2013/0237300 A1* | 9/2013 | Johnson | 463/13 |

FOREIGN PATENT DOCUMENTS

| | | | | |
|---|---|---|---|---|
| KR | 10-2007-0106510 | 11/2007 | | |
| KR | WO 2008082095 A1 * | 7/2008 | | G06F 3/0488 |
| TW | 201128529 A1 | 8/2011 | | |

OTHER PUBLICATIONS

Extended European Search Report dated Apr. 9, 2015 in European Application No. 13755431.7.

First Office Action dated Nov. 17, 2015, in Taiwanese Patent Application No. 102106905.

English Language Abstract for TW201128529A1 dated Aug. 16, 2011 and dated Dec. 3, 2015.

First Office Action dated Jun. 3, 2016 in corresponding Chinese Patent Application No. 201380022183.0.

* cited by examiner

SYSTEMS AND METHODS FOR PRESENTING VISUAL INTERFACE CONTENT

TECHNICAL FIELD

The present disclosure relates to the management and presentation of visual information or optical signals by display-enabled keyboards, keypads, and/or other types of user input devices. More particularly, embodiments of the present disclosure relate to systems and methods for selectively controlling the presentation of visual interface content that includes primary visual interface content and adjunct visual interface content. Primary visual interface content is displayable by a primary display apparatus (e.g., a computer monitor). Adjunct visual interface content is displayable by one or more display-enabled user input devices, and possibly also by the primary display apparatus. A display-enabled user input apparatus such as a display-enabled keyboard, keypad, computer mouse, or game controller is configured to (a) receive user input directed to controlling aspects of application program execution; and (b) selectively present one or more types of adjunct visual interface content associated with a set of application programs in an adaptive manner based upon user input (e.g., directed to the display-enabled user input apparatus), primary visual interface content, and/or application program execution context, status, or state.

BACKGROUND

Electronic games have become increasingly popular in recent decades. Various types of electronic games have demonstrated strong or very strong market growth over time, such as First Person Shooter (FPS) games and Internet-based massively multiplayer online (MMO) games. These types of games as well as other types of types of electronic games are expected to demonstrate continued strong market growth in the foreseeable future.

During the execution of an application program corresponding to a game, a visual interface that provides game-related visual content is presented or displayed to a user, player, or gamer. Depending upon a game application program under consideration, the visual interface can include visual representations of scenes corresponding to a particular game environment in which game play is currently occurring; current interactions between game characters; currently relevant game related information (e.g., character status or attributes, or visual or virtual environment maps); and messages directed to the user. A visual interface can further include visual representations of particular types of game related functions or operations that are currently available for user selection. As the context, status, or state of an electronic game evolves over time in association with user input and game application program execution, visual interface content should adaptively indicate current game context, status, or state at any given moment. That is, visual interface content should be appropriately and dynamically updated such that it visually conveys the current game environment, current interactions between game characters, current game related information, and currently relevant (e.g., strategically or tactically relevant) game related functions or operations that are available for user selection.

As technology has evolved, electronic games and the visual interfaces associated therewith have become increasingly complex. For example, the types of visual environments in which game play can occur; the types of game characters and the manners in such characters can act and/or interact; the types of game related information that can be provided to the user; and the types of user selectable game related functions or operations that can be of situational value have increased and/or become more complex or intricate. Unfortunately, manners in which conventional systems, apparatuses, devices, and techniques for providing visual interface content adapt such content to evolving game context, status, or state are undesirably limited, inefficient, or cumbersome. Additionally, conventional systems, apparatuses, devices, and techniques for tailoring or increasing the number of game related application functions provided for user selection, such as game specific keyboards that provide a customized set of user selectable keys or buttons corresponding to a particular game application program, are inflexible with respect to their ability to adapt to different types and/or or increased numbers of user selectable functions across different game application programs (including different generations of the same game).

In addition to the foregoing, the increasing complexity and graphical details of many games and the sheer amount of visual information that can be generated corresponding to user interaction with an virtual environment has resulted in the display of increasing amounts and/or types of visual interface content during game play, which can result in visual interface content that appears cluttered, confusing, visually distracting, or difficult to interpret or decipher, which can adversely impact the user's visual experience, user input accuracy, and/or user efficiency in interacting with a game application program.

Accordingly, improved systems, apparatuses, devices, methods, and/or techniques are needed for presenting visual interface content to the user and adaptively updating visual interface content in a manner that can enhance a user's visual experience, increase the efficiency of user interaction with a game application program, and/or increase the number and/or types of game application related functions or operations that are available for user selection at one or more times.

SUMMARY

In accordance with a first aspect of the invention, there is disclosed an automated method for presenting visual interface content comprising adjunct visual interface content during application program execution, and the adjunct visual interface content provides visual information associated with application program execution. The method comprises displaying the adjunct visual interface content using a first interface, displaying the adjunct visual interface content using a second interface, and displaying the updated adjunct visual interface content on the at least one of the first and second interfaces based on actuation of the first and second interfaces.

In accordance with a second aspect of the invention, there is disclosed a device which functions as a display-enabled user input apparatus, the device comprising a first set of display elements of at least one display element and a corresponding first display controller, a second set of display elements of at least one display element and a corresponding second display controller, a first set of tactile keys comprising a set of QWERTY keys, a second set of display-enabled tactile keys, wherein each display-enabled key comprises a tactile key and a display element belonging to the second set of display elements, a touch sensor and a corresponding touch sensor controller and a USB controller. In addition, the user input through the first set of tactile keys and second set of display-enabled tactile keys are transmitted to a corresponding Computer Programmable Logic Device (CPLD).

DETAILED DESCRIPTION

Representative embodiments of the disclosure for addressing one or more of the foregoing problems are described hereafter. For purposes of brevity and clarity, the description herein is primarily directed to user interface systems, apparatus, devices, techniques, and processes for managing, coordinating, mapping, controlling, presenting, and/or selecting visual information corresponding to a primary visual interface and one or more adjunct, auxiliary, or secondary visual interfaces. This, however, does not preclude various embodiments of the disclosure from other applications where fundamental principles prevalent among the various embodiments of the disclosure such as operational, functional, or performance characteristics are required. With respect to the description herein and the corresponding FIGURES, like or analogous reference numerals indicate like or analogous elements. Relative to descriptive material corresponding to one or more FIGURES, the recitation of a given reference numeral can indicate simultaneous consideration of a FIGURE in which such reference numeral was previously shown.

In the context of the present disclosure, the term set is defined as a non-empty finite organization of elements that mathematically exhibits a cardinality of at least 1 (i.e., a set as defined herein can correspond to a singlet or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)).

Representative Aspects of Primary and Adjunct User Interfaces

In general, a user interface can encompass hardware (e.g., user input hardware and visual information output hardware), software (e.g., program instructions corresponding to one or more of firmware, an operating system, and an application program), generated visual information or constructs (e.g., one or more of text, symbols, icons, graphical widgets, visual environments or scenes, animations, video, and portions of user and/or non-player characters), generated effects (e.g., lighting effects or sounds), and/or communicated information (e.g., notifications or messages) that facilitate or effectuate a user's interaction with one or more automated, computerized, or electronic systems or devices, and/or other users of such systems or devices.

In accordance with embodiments of the disclosure, a user interface includes a primary visual interface and one or more adjunct visual interfaces associated with the primary visual interface. An adjunct visual interface can facilitate or enhance a user's interaction with the primary visual interface, an application program, and/or other users. An adjunct visual interface can serve as a support interface for the primary visual interface, and can be associated with or related to particular types of user controllable or user selectable tasks or operations.

In general, the primary visual interface is configured to provide, present, or output primary visual content, information, and/or signals (hereafter primary visual content), and the adjunct visual interface is configured to provide, present, or output adjunct visual content, information, and/or signals (hereafter adjunct visual content). Primary visual content serves as the primary, principal, main, or most direct source of visual information or subject matter by which the current execution status, context, or state of a set of local and/or remote application programs, as well as the results of user interaction with such application programs, are visually indicated, output, or conveyed. Primary visual content is dynamically or progressively updated (e.g., in a real time, near-real time, quasi-real time, synchronous, or generally synchronous manner) in accordance with the current execution status, state, or context of an application program. For instance, an application program execution state can evolve in response to local and/or remote user interaction with (e.g., user input directed to) a set of corresponding local and/or remote application programs, and primary visual content can be updated accordingly based upon such user interaction. Thus, primary visual content can visually indicate or correspond to a current application program execution context and a current state or status of one or more users at any given time.

Adjunct visual content serves as a source of adjunct, associate, or secondary information or subject matter that facilitates or enables the performance of one or more types of functions, operations, or tasks associated with the primary visual interface and/or a local or remote application program. Depending upon embodiment details, adjunct visual content can correspond to (a) application program events (hereafter application events) directly related to, indicated by, or reflective of current primary visual content, including in-application events occurring within the execution context or thematic progression of a currently-executing application program; (b) application events (e.g., in-application events) indirectly related to, unrelated to, or not reflective of current primary visual content (e.g., corresponding to a currently undisplayed portion of a visual or virtual environment or world, which is absent from the primary visual interface content); (c) text, animation, video, or graphical content, elements, objects, symbols, emblems, constructs, or entity representations (e.g., game characters) associated with an application program; (d) visual information (e.g., text and/or video) received from other users; (e) a chronology, narrative, or sequence of events associated with an application program; and/or (f) other information.

Adjunct visual content can be adaptively updated based upon changes in primary visual content; application program execution state, context, or status; and/or user input. Adjunct visual content can (a) be selectively retrieved, generated, presented, interrupted or recalled while primary visual content is progressively or dynamically updated during application program execution; or (b) remain persistent or generally persistent at one or more times while primary visual content is progressively or dynamically updated. Particular adjunct visual content can be presented or displayed to or hidden from a user depending upon primary visual content and/or a current application program execution state or context.

For purpose of brevity and to aid understanding, particular portions of the description herein are directed to embodiments in which primary visual content and adjunct visual content correspond to or are associated with an electronic entertainment application such as a single-player or multi-player computer or electronic game, which can correspond to essentially any game genre such as one or more of a strategy game, a tactical game, an adventure game, a visual novel, an interactive movie, an action-adventure game, a role playing game (RPG), a navigation game, a combat game, a first person (e.g., first person shooter (FPS)) game, a third person (e.g., third person shooter) game, a vehicular (e.g., racing) game, an educational game, a training game, a simulation (e.g., a life scenario, construction, business, aircraft, spacecraft, or other type of simulation) game, a maze game, a puzzle game, a trivia game, a board game (e.g., checkers, chess, or mahjong), a card game, a gambling game, a music game, a dance game, a sports game, an exercise game, a party game, and/or another type of game.

In some embodiments, primary visual content and adjunct visual content can correspond to or be associated with an MMO game, which can involve dozens, hundreds, or even thousands of users, players, or participants. An MMO game can be, for instance, an MMO Role Playing Game (MMORPG), an MMO Real Time Strategy (MMORTS) game, an MMO First Person Shooter (MMOFPS) game, an MMO Social Game (MMOSG), an MMO Sports Game (MMOSG), or other type of MMO game.

Notwithstanding the foregoing, aspects of the present disclosure can additionally or alternatively involve primary visual content and adjunct visual content that corresponds to or is associated with user-to-user collaboration, communication or messaging (e.g., electronic conferencing, or text, voice, or video messaging or chat); user interaction with a virtual world or virtual community; user education/training; media content development (e.g., audio and/or visual information editing); or other applications, which can be related or unrelated to computer or electronic gaming. Embodiments provided by the present disclosure are not precluded from applications in which particular fundamental structural and/or operational principles described herein are desired.

Aspects of Representative System Embodiments

Figure 1:
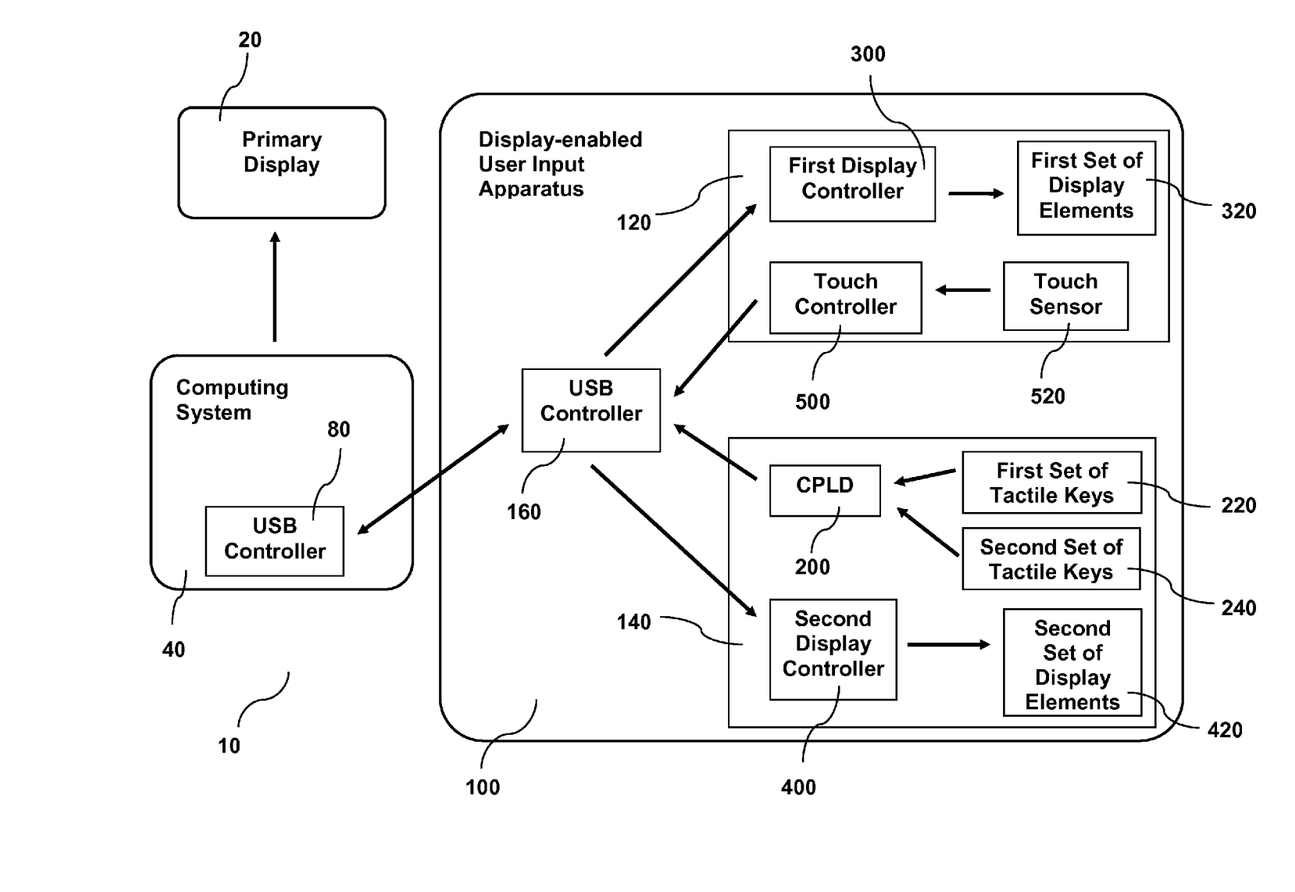
FIG. 1 shows a system diagram of the representative system for managing, controlling, selecting, presenting, and/or updating primary visual interface content and adjunct visual interface content.

FIG. 1 is a schematic illustration of a representative system 10 for managing, controlling, selecting, presenting, and/or updating primary visual interface content and adjunct visual interface content using a primary display apparatus 20 and at least one display-enabled user input apparatus 100 according to particular embodiments of the disclosure. The primary display apparatus 20 and each display-enabled user input apparatus 100 are coupled to or form a portion of a computing system 40 or computing device such as a desktop or laptop computer or an electronic gaming system, apparatus, or device (e.g., a game console system, or a portable or handheld gaming device) that is configured to execute stored program instructions and/or perform state machine operations that manage, direct, or perform visual interface content management operations, including primary visual interface content management operations and adjunct visual interface content management operations, in accordance with an embodiment of the disclosure.

Primary visual interface content corresponds to primary visual content as described above, and forms portions of a primary visual interface which can include hardware configured to present primary visual interface content, software or program instructions configured to generate, update, and/or manage or control the presentation of primary visual interface content, and primary visual interface content itself. Representative types of primary visual interface content include images or visual representations of characters associated with one or more local users, one or more remote users, and/or non-player characters; and graphical elements that form portions of a visual or virtual environment or world. Primary visual interface content can be presented or displayed in a main viewing region, surface, area, or window 102 of the primary display apparatus 20.

Adjunct visual interface content corresponds to adjunct visual content as described above, and forms portions of an adjunct visual interface which can include hardware configured to present adjunct visual interface content, software or program instructions configured to generate, update, and/or manage or control the presentation of adjunct visual interface content, and adjunct visual interface content itself.

Particular representative types of adjunct visual interface content can include, for instance, (a) one or more sets of user selectable images or graphical icons (e.g., corresponding to visually selectable application program functions or function sequences); (b) one or more types of visual messages (e.g., text or video messages, or scenes within an animated narrative); (c) descriptive or categorical information or data corresponding to particular primary visual interface content and/or application program subject matter (e.g., textual, graphical, and/or image data providing explanatory information related to an object within a visual or virtual environment or world); (d) one or more visual overlays or menus that can be displayed in response to user selection of particular application functions or function sequences; (e) one or more visual condition or event notifications corresponding to application situations, conditions, or events that are directly or not directly indicated or conveyed by current primary visual interface content (e.g., notifications of events associated with current primary visual interface content, and/or notifications of events within a portion of a visual or virtual environment or world that is outside of or external to a region or visual space defined by current primary visual interface content); (f) remotely monitored content corresponding to information that is not directly indicated or conveyed by primary visual interface content (e.g., recorded, monitored, surveilled, generated, or retrieved information corresponding to a portion of a visual or virtual environment or world that is outside of or external to a region or visual space defined by current primary visual interface content, which is not currently displayed by the primary display apparatus 20); and/or other visual information.

As further described in detail below, in several embodiments adjunct visual interface content can be presented or displayed by one or more display devices or elements carried by portions of a display-enabled user input apparatus 100, such as one or more proximity sensitive, proximity responsive, presence sensitive, presence responsive, pressure sensitive, pressure responsive, force sensitive, force responsive, motion sensitive, motion responsive, orientation sensitive, orientation responsive, position sensitive, position responsive, light sensitive, light responsive, sound sensitive, sound responsive, touch sensitive, touch responsive, object sensitive, and/or object responsive user input elements that are adapted or configured for outputting or transmitting visual signals. In some embodiments, adjunct visual interface content can additionally or alternatively be presented or displayed by one or more display devices or elements that exclude or omit proximity, presence, pressure, force, motion, orientation, position, light, sound, touch, or object sensitive or responsive user input elements.

During application program execution, the main purpose or function of the primary display apparatus 20 is to present or display primary visual interface content. Depending upon the embodiment, configuration, and/or implementation details the primary display apparatus 20 can additionally present or display particular adjunct visual interface content at one or more times (e.g., in a selective, programmable, or configurable manner). The primary display apparatus 20 includes at least one display device, such as a 2D or 3D display device (e.g., a display corresponding to a computer, electronic gaming device, or game console). An exemplary embodiment of the primary display apparatus is a computer display monitor, such as a LCD or LED monitor.

In some embodiments, the primary display apparatus 20 includes or carries one or more proximity sensitive, proximity responsive, presence sensitive, presence responsive, pressure sensitive, pressure responsive, force sensitive, force responsive, motion sensitive, motion responsive, orientation sensitive, orientation responsive, position sensitive, position responsive, light sensitive, light responsive, sound sensitive, sound responsive, touch sensitive, touch responsive, object sensitive, and/or object responsive elements, devices, or surfaces configured to detect or receive user input. In such embodiments, the primary display apparatus 20 can be defined as an input-enabled display apparatus. For instance, in certain embodiments, the primary display apparatus 20 can include a touch screen display. In other embodiments, the primary display apparatus 20 omits or excludes proximity, presence, pressure, force, motion, orientation, position, light, sound, or touch sensitive or responsive elements, devices, or surfaces.

A display-enabled user input apparatus 100 is configured to receive user input directed to controlling aspects of application program execution and/or user interaction with the primary visual interface, and is further configured to present or display particular adjunct visual interface content at one or more times (e.g., in a selective, programmable, or configurable manner). The main purpose or function of a display-enabled user input apparatus 100 is to provide a user input/visual output interface that presents or outputs adjunct visual interface content that can be selected by way of user input directed to one or more user input elements carried by the display-enabled user input apparatus 100. In various embodiments, at least some user input elements can be adapted or configured to transmit or output visual signals in a manner that facilitates or enables the presentation or display of adjunct visual interface content, as further described in detail below.

A display-enabled user input apparatus 100 includes at least one user input device, such as a keyboard, keypad, computer mouse, trackball, joystick, or game controller that carries and/or is coupled to at least one set of elements or structures configured for detecting or receiving one or more types of user input. Such user input elements or structures can include one or more proximity sensitive, proximity responsive, presence sensitive, presence responsive, pressure sensitive, pressure responsive, force sensitive, force responsive, motion sensitive, motion responsive, orientation sensitive, orientation responsive, position sensitive, position responsive, light sensitive, light responsive, sound sensitive, sound responsive, touch sensitive, touch responsive, object sensitive, and/or object responsive elements or structures.

The at least one set of user input elements or structures may be included or coupled to a corresponding controller, e.g. a touch sensor element 520 is coupled to a touch controller 500. The controller 500 functions as a device to translate sensed interaction with the touch sensor 520 into control signals, e.g. touch coordinates, which are transmitted to the computing system through a connection such as a USB cable connection, based on the user's input through the corresponding user input element or structure.

A display-enabled user input apparatus 100 further includes, carries, and/or is coupled to at least one set of optical signal or image presentation, display, or output elements or structures. The at least one set of optical signal, image presentation, display, or output elements or structures may include or be coupled to display controllers 300, 400. The display controllers 300, 400 functions as a device for receiving and deciphering output signals from the computing system 40 for transmission through the optical signal, image presentation, display, or output elements or structures.

Such image presentation elements or structures are separate or distinct from the primary display apparatus 20, and are configured for transmitting, outputting, or displaying visual signals corresponding to portions of textual, graphical, or video images of the primary display, or to the at least one application being run on the computing system 40, or to the input signals from one or more controllers corresponding to the respective user input elements or structures. Depending upon (a) embodiment details; (b) implementation details; (c) configuration details; (d) events corresponding to current and/or prior primary visual interface content; (e) events corresponding to a region within a visual or virtual environment or world that is outside the scope of, external to, or not directly indicated by a visual or virtual region defined by current primary visual interface content; (f) user input; and/or (g) an application program execution context, status, or state, particular optical signal or image presentation elements or structures can display adjunct visual interface content in a static or dynamic manner (e.g., with respect to one or more time intervals, and/or based upon user input events or application program events), as further detailed below.

In several embodiments, a display-enabled user input apparatus 100 includes one or more user selectable input devices, elements, or structures (e.g., a type of proximity, presence, pressure, force, motion, orientation, position, light, sound, touch, or object sensitive or responsive element or structure configured to convert or transduce user action(s), selection(s), or intention(s) to a set of user input signals) that are adapted or configured for transmitting, outputting, or displaying visual signals corresponding to portions of textual, graphical, or video images. For instance, a display-enabled user input apparatus 100 can include a user input device having a set of display-enabled tactile, pressure sensitive, force sensitive, touch sensitive, or touch responsive input elements which in certain embodiments corre-spond to portions of a display-enabled keyboard or keypad.

Depending upon embodiment details, a display-enabled user input apparatus 100 such as the display-enabled keyboard can have display-enabled user input elements or structures which can comprise a first set of tactile keys 220 comprising the standard QWERTY keys, a second set of tactile keys 240 which are in addition to the QWERTY keys, a first set of display element(s) 320, a second set of display elements 420 and a touch sensor 520. Input in the form of key strokes from the first set of tactile keys 220 and second set of tactile keys 240 are channeled to a Complex Programmable Logic Device (CPLD) 200, which processes the input into appropriate input signals based on pre-programmed instructions. The input signals are then transmitted to the computing system 40 through a USB controller connected to the CPLD 200.

The second set of display elements 420 may operate in conjunction the second set of tactile keys 240. An exemplary embodiment comprises each tactile key, in a second set of tactile keys 240, including an optically transmissive or transparent display window offset from or disposed above each display element in a second set of display elements 420, each display element being an LCD or OLED display screen. The adjunct visual interface content corresponds to the main application that is being run on the computing system 40, such as a game application, may be displayed on the second set of display elements 420, and the adjunct visual interface content displayed on each individual display element in the set may correspond to the control functions of the individual tactile key belonging to the second set of tactile keys 240 that the display element may be working in conjunction with. User input through the second set of tactile keys 240 are then processed by the CPLD 200 into input signals for transmission to the computing system 40 through USB controllers 80 and 160.

Input in the form of a set of gestures and movements on the touch sensor 520 are transmitted to a touch controller 500, which processes the input into appropriate input signals based on pre-programmed instructions. The input signals are then transmitted to the computing system 40 through a USB controller 160 connected to the touch controller 500. The second set of one or more display element(s) 420 may work in conjunction with the touch sensor 520. In an exemplary embodiment, the adjunct visual interface content corresponding to the main application that is being run on the computing system 40, such as a game application, may be displayed on a display element belonging to the first set of one or more display element(s) 320. A user may then provide input through a touch sensor 520 which operates in correspondence to the display element of the first set of one or more display elements 320. In certain embodiments, at least some of such keys or buttons can be resiliently biased.

In several embodiments, a display-enabled user input apparatus 100 can additionally include one or more pointing devices such as an isometric joystick, pointing stick, or pointing nub; a trackball; or a touchpad or trackpad. In certain embodiments, a touchpad or trackpad corresponding to or carried by a display-enabled user input apparatus 100 can include a display element or visual signal output device. For instance, a touchpad carried by a display-enabled user input apparatus 100 can include an LCD screen or pad that includes optical sensors configured to detect pen or stylus based input as well as finger based input.

Representative Aspects of the Display-Enabled User Input Apparatus

An exemplary embodiment of the display-enabled user input apparatus 100 comprises a first interface 120 of the adjunct visual interface, which is a LCD-based touchpad which can function as both a trackpad and touchscreen and is nestled within a keyboard that is connected to a computing system 40. This LCD-based touchpad comprises a touch sensor 520 connected to a touch controller 500 and at least one display element belonging to the first set of display elements 320 connected to a first display controller 300, as aforementioned, Thus, the touch sensor 520 and display element operate in conjunction with each other to provide the LCD-based touchpad. The trackpad comprise an interface in which gestures and/or multi-touches made within the trackpad can be used to control the movement of the cursor on the monitor screen. The touchscreen comprises a display-enabled interface, such as a graphical user interface (GUI), which can receive input via the touch sensor 520, and the display output data transmitted to a first display element or structure 320 via a first display controller 300 of the first interface 120 may or may not be independent of the content that is already displayed on a primary display apparatus 20.

The display-enabled user input apparatus 100 may also further include a second interface 140 of the adjunct visual interface, which is a set of the display-enabled keys, placed in proximity of the LCD-based touchpad, such as, but not limited to, in the form of two rows of the second set of tactile keys 240 operating in conjunction with the second set of display elements 420, as described in the earlier paragraphs, and the display-enabled keys are placed above the LCD-based touchpad. The adjunct visual interface content in at least one of the first interface 120 and second interface 140 may be updated so as to correspond to the event triggered each time there is a new set of user input through at least one of the first interface 120 and second interface 140 of the adjunct visual interface and other user input elements or structures. The display-enabled user input apparatus may also include the first set of tactile keys 220 comprising the standard QWERTY keys, such as those of a keyboard, as mentioned in the earlier paragraphs. Further to a new event that is triggered via user input in the computing system 40, the adjunct visual interface content in at least one of the first interface 120 and second interface 140 will be updated to correspond to the new event.

The particular functions of the content that is displayed on the display-enabled user input apparatus 100 at any point in time is determined and triggered by the specific pre-programmed event type. The event types comprise, but are not limited to, application events within a computing system 40, mode events within an application of a computing system 40, and action set events within a mode of an application. The triggering of any of the event is dependent on the pre-programmed input entered by the user by means of entering a set of input(s) through a user input apparatus, including the display-enabled user input apparatus 100, connected to the computing system 40. The user input apparatus may be, but is not limited to, at least one of a keyboard, mouse, stylus, mousepad, drawing pad, game consoles, audio output devices and printers. When a keyboard is used as the user input apparatus, keystrokes from at least one of the set of standard QWERTY keys and the set of display-enabled keys may be used to provide a specific input according to pre-programmed instructions to trigger a specific event which will determine the specific function of the display-enabled user input apparatus 100 at a point in time. At least one of the set of standard QWERTY keys and the set of display-enabled keys from the second interface 140 may also be used in conjunction with the LCD touchpad of the first interface 120 of the display-enabled user input apparatus 100, for both in responding to a triggering of an event and for the triggering of an event, including those event(s) in relation to the below-mentioned functions of the display-enabled user input apparatus 100.

For example, whether the touchpad of the first interface 120 of the display-enabled user input apparatus 100 is functioning as a trackpad or a touchscreen at any point in time, is dependent on the triggering of a specific event. In addition, in any of the below-mentioned functions of the display-enabled user input apparatus 100, a default function, whether as a trackpad or a touchscreen, may be set, and the user may further toggle between the trackpad or touchscreen function of the LCD touchpad within the display-enabled user input apparatus 100 through the triggering of a pre-programmed event.

For example, a user may be using the first interface 120 as a trackpad when navigating the cursor within a drawing application. In the transition comprising the exiting of the drawing application and starting up of a game application, the transition of which is the pre-programmed event, the first interface 120 is toggled from a trackpad function to a touchscreen function, and the touchscreen displays controls corresponding to the game application. Another embodiment of the LCD touchpad includes a user using the first interface 120 as a trackpad initially when a first mode event within a game application is triggered, and user input leading to the entry into a second mode event within the same game application may trigger the first interface 120 to function as a touchscreen, in which the touchscreen displays controls or a visual environment such as a supplementary map corresponding to the second mode event. In yet another embodiment of the LCD touchpad, a user is using the first interface 120 as a touchscreen displaying game controls corresponding to a first mode event initially when a first mode event within a game application is triggered, and user input leading to the entry into a second mode event within the same game application may trigger the first interface 120 to function as a trackpad, in which the trackpad allows the user to resume control of the cursor movement or navigation by gestures or movements within the trackpad.

One embodiment of a function of the display-enabled user input apparatus 100 is to serve as an extension of the primary display apparatus 20. The primary display apparatus 20, may be for example, but not limited to, a separate LCD or LED monitor. As an extension of the primary display apparatus 20, at least one of the first interface 120 and second interface 140 of the adjunct visual interface, the LCD touchpad and the set of display-enabled keys respectively, of the display-enabled user input apparatus 100 may include displaying content similar to and/or related to the content that is already displayed on the primary display apparatus 20, depending on the triggering of a specific event.

For example, a user may be in a mode event within a game application, of which that mode event involves a user avatar to navigate within a determined region of the visual environment. When in that mode event, the primary display apparatus 20 may display the current surrounding environment, such as the trees that are nearest to the user avatar in a forest that the user avatar is currently navigating within, while the LCD touchpad of the display-enabled user input apparatus 100 is triggered to display a larger visual geographical environment which encompasses a region that is larger in virtual geographical area than the forest. The display-enabled keys will display graphics, each key corresponding to a control to trigger each of various events relating to at least one of the action set events, mode events or application events which correspond to the current mode event. Conversely, in another example, the primary display apparatus 20 may display the larger virtual geographical area surrounding and including the forest, and the LCD touchpad may display only a more detailed sub-region of the virtual geographical area displayed on the primary display apparatus 20, such as the nearest trees surrounding the avatar in a forest. The display-enabled keys will display graphics, each key corresponding to a control to trigger each of various events relating to at least one of the action set events, mode events or application events which correspond to the current mode event. Further to a new event that is triggered via user input in the computing system 40, the adjunct visual interface content in at least one of the first interface 120 and second interface 140 will be updated to correspond to the new event, such as an updated virtual geographical environment relating to a new and/or different region than the previous one(s), and updated display of controls corresponding to the new event.

Another embodiment of a function of the display-enabled user input apparatus 100 is to provide control over auxiliary or background applications running on the computing system 40, other than the main application that the user is using at a point in time. Examples of such auxiliary or background applications include, but are not limited to, a media player, a VoIP (voice over internet protocol) application, an instant messaging application, a video chat/conferencing application, an email application and an internet browser. An exemplary use of such a control using the display-enabled user input apparatus 100 is the display of controls for a media player which is running in the background while in the midst of a game application that is the main application. Another exemplary use of such a control using the display-enabled user input apparatus 100 is the display of controls for a simultaneous live video chat application embedded within, or external to the main application, such as a game application, within a computing system 40, through at least one of the 120 and second interface 140 of the adjunct visual interface.

Another embodiment of a function of the display-enabled user input apparatus 100 is to at least one of control the display of, and function as a display for at least one bypass secondary apparatus through at least one of the first interface 120 and second interface 140 of the adjunct visual interface. The bypass secondary apparatus is defined as a secondary external device that is connected directly to a display-enabled user input apparatus 100 such as a keyboard which is display-enabled, and bypass the processing by the computing system 40 that the display-enabled user input apparatus is connected to. The user may control the at least one bypass secondary apparatus through the display-enabled user input apparatus 100 using input comprising interactions made up of gestures made on the LCD-based touchpad of the first interface 120 and/or keystrokes from at least one of the standard QWERTY keys set and the display-enabled keys of the second interface 140. The user may also use the LCD-based touchpad of the first interface 120 as a display for at least one of the digital content and controls corresponding to the at least one bypass secondary apparatus. Exemplary uses of the display-enabled user input apparatus 100 for controlling of a bypass secondary apparatus include, but are not limited to, the browsing and displaying of videos or photographs stored in a media player device, the browsing and playing of songs from a media player device, displaying of information corresponding to at least one media file from a media player device, the controlling of audio functions, such as but are not limited to, pre-set audio equalizer modes, audio volume, treble and bass levels of at least one set of audio speakers and the simultaneous at least one of download and upload of content from a storage device. Further to a new event that is triggered via user input comprising interactions made up of gestures made on the LCD-based touchpad of the first interface 120 and/or keystrokes from at least one of the standard QWERTY keys set and the display-enabled keys of the second interface 140, or the detection of a connection of an additional apparatus to the computing system 40 or to the display-enabled user input apparatus, the adjunct visual interface content in at least one of the first interface 120 and second interface 140 will be updated to correspond to the new event, such as an updated display of controls corresponding to the new event. Examples of the bypass secondary apparatus include a media player device, a digital camera, a mobile phone, a set of audio speakers or headphones. Other examples also include any apparatuses which are compatible in connecting directly to one or more connection ports that the display-enabled user input apparatus 100 might have, such as but are not limited to, a USB port, an audio jack socket, serial port, parallel port, PS/2 port, a VGA port, S-video port, HDMI port, a games port, a e-Sata port, a display port, PCMCIA/cardbus ports, firewire ports, Ethernet port, modem port and digital video interfaces.

Another embodiment of the display-enabled user input apparatus 100 is to function as a toggle control between a set of pre-programmed events, and the set of pre-programmed events are triggered when, for example, but are not limited to, a number of user input devices are detected to be connected to the computing system 40 and at least one application is running on the same computing system 40. This set of pre-programmed events then may include a set of various functions, such as, but are not limited to, cursor control, controlling of externally connected devices, controlling of applications that are being run on the computing system 40 and controlling of at least one of, the first set of tactile keys 220 comprising the standard QWERTY keys and the second set of tactile keys 240 comprising the display-enabled keys. Hence, toggling between the pre-programmed events may comprise, but are not limited to, toggling between a cursor control, action sets within an application mode, application modes within an application and applications running within a computing system 40.

In the exemplary embodiment of a display-enabled user input apparatus 100 nestled within a keyboard, there are sets of interactions within the interface that may provide for further functions. These sets include a first set of interactions between the LCD-based touchpad of the first interface 120 and the set of QWERTY keys 220; and a second set of interactions between the LCD-based touchpad of the first interface 120 and the set of display-enabled keys 240 of the second interface 140. The further functions corresponding to the above-mentioned sets of interactions include, but are not limited to, the recording of macros and gestures in relation to specific events that can be triggered. Examples of events include action set events within a mode of an application, or mode events within an application. Exemplary embodiments of such an application include, but are not limited to, First-Person Shooter (FPS) games and massively multi-player online (MMO) games.

In addition, the second set of interactions between the LCD-based touchpad of the first interface 120 and the set of display-enabled keys of the second interface 140 may also provide for other functions. The second set of interactions between the LCD-based touchpad of the first interface 120 and the set of display-enabled keys of the second interface 140 may further include the control of the functions of each individual key in the set of display-enabled keys and the corresponding display within the display element or structure, such as an LCD and/or OLED screen of each individual display-enabled key, upon the triggering of a corresponding event. Exemplary embodiments of the corresponding event include an action set within a game mode; and a game mode within an application, the application being for example, a FPS or MMO game, and the corresponding event can be toggled to and from other action sets or game modes within the same application by means of user inputs through at least one of the first and second sets of interactions. Once the corresponding event for a specific action set or game mode is triggered, the functions of the display-enabled keys are activated in relation to the corresponding specific action set or game mode.

Depending upon (a) embodiment, configuration, or implementation details; (b) current primary visual interface content; (c) a current application program execution context, status, or state; and/or (d) user input, particular adjunct visual interface content can be simultaneously presented or displayed by portions of both the primary display apparatus 20 and the first interface 120 and second interface 140 of the adjunct visual interface of a display-enabled user input apparatus 100. That is, at least a particular portion or a subset of adjunct visual interface content that is presented or displayed by a set of display-enabled user input apparatuses 100 can be simultaneously displayed by the primary display apparatus 20. Additionally or alternatively, particular adjunct visual interface content can be exclusively presented or displayed by portions of a display-enabled user input apparatus 100 at one or more times rather than the primary display apparatus 20, thereby increasing or maximizing an amount of application related visual information that can be efficiently conveyed to the user, increasing or extending a number of user selectable application program functions or operations that can be visually presented to the user, and/or enhancing the effectiveness of user interaction with an application program.

Additionally, the presentation of particular adjunct visual interface content by portions of a display-enabled user input apparatus 100 rather than the primary display apparatus 20 can increase or maximize an extent to which the primary display apparatus 20 can present or output primary visual interface content, and/or reduce or minimize visual clutter that unnecessarily or undesirably detracts from, interferes with, or limits the presentation of primary visual interface content to the user. The designation of particular types of adjunct visual interface content as presentable by one or more display-enabled user input apparatuses 100 and/or the primary display apparatus 20 can occur in a predetermined or a selectable or programmable manner, for instance, by way of a configuration interface as further described in detail below.

In some embodiments, in association with or following user selection, specification, assignment, or the mapping of particular adjunct visual interface content to portions of one or more display-enabled user input apparatuses 100 rather than the primary display apparatus 20, an application program can automatically adjust or modify a displayable or displayed extent, size, amount, or area of primary visual interface content. For instance, based upon an extent to which portions of the primary display apparatus 20 are excluded from presenting particular adjunct visual interface content, an application program can expand a set of visual or virtual boundaries corresponding to the primary visual interface content, and/or resize primary visual interface content relative to a region, area, or surface of the primary display apparatus 20. Resizing primary visual interface content can result in the display of an increased amount of primary visual interface content, and/or the display of primary visual interface content having an enhanced level of detail or visual granularity.

In multiple embodiments in accordance with the present disclosure, user interaction with or selection of one or more types of adjunct visual interface content presented by at least one of the first interface 120 and second interface 140 of the adjunct visual interface of the display-enabled user input apparatus 100 (e.g., as a result of user selection of one or more display-enabled keys or buttons in the second interface 140 and/or portions of a touch screen in the first interface 120), either alone or in association or combination with user selection of primary and/or adjunct visual interface content, presented by the primary display apparatus 20 (e.g., as a result of user selection of primary display apparatus visual interface content, using a pointing device) can result in enhanced economy of user motion compared to user manipulation of conventional input devices (e.g., a conventional computer mouse), simplified or more convenient user selection of particular adjunct visual interface content of interest, and/or enhanced efficiency user interaction with a set of local and/or remote application programs.

For example, a user can rapidly and efficiently select a given graphical action key in relation to the main application which is being run, such as a FPS or MMO game, that is presented or displayed by the display-enabled user input apparatus 100 by directly manipulating, pressing, or touching a particular display-enabled key or button that displays the graphical action key of interest, rather than manipulating a conventional computer mouse to (a) move a pointer or cursor displayed by the primary display apparatus 20; (b) align the pointer or cursor over the graphical action key of interest; and (c) select the graphical action key of interest using a mouse button. In addition, user selection of adjunct visual interface content presented by the display-enabled user input apparatus 100 can result in fewer user input errors resulting from imprecise or incorrect user positioning of a pointer or cursor displayed by the primary display apparatus 20, and thus fewer undesirable or unintentional application program events or errors, particularly when rapid or very rapid user interaction with an application program (e.g., a computer game) is desired or required.

During the execution of a particular application program within a plurality of application programs for which adjunct visual interface content can be generated or retrieved and presented by a set of display-enabled user input devices 100, adjunct visual interface content can be presented or displayed at one or more times in a manner that is specifically or uniquely tailored or adapted to the particular application program under consideration, and which is further dynamically adapted during the execution of this application program based upon execution context, status, or state; primary visual interface content; adjunct visual interface content; and/or user input. Embodiments of the present disclosure can therefore eliminate a need for prior types of application program specific input devices (e.g., game specific keyboards, which are non-adaptable or non-reconfigurable or minimally-reconfigurable with respect to different application programs) that attempt to enhance the number or types functions or information presented for user selection.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

The invention claimed is:

1. An automated method for presenting visual interface content comprising adjunct visual interface content during application program execution, the adjunct visual interface content providing visual information associated with an application program being run on a computing system, the method comprising:
coupling a keyboard to the computing system via a first connection port, the keyboard comprising:
a first interface comprising a first set of tactile keys and a touch sensor, the first set of tactile keys comprising a set of QWERTY keys;
a second interface comprising a second set of display-enabled tactile keys, wherein each display-enabled key comprises a tactile key and a display element;
the first connection port; and
a second connection port;
displaying the adjunct visual interface content using the first interface and the second interface;
receiving user input using at least one of the first set of tactile keys, the second set of display-enabled tactile keys or the touch sensor;
transmitting user input through the first set of tactile keys and the second set of display-enabled tactile keys to a corresponding Computer Programmable Logic Device;
displaying updated adjunct visual interface content on at least one of the first interface and the second interface in response to an updated event in the application program execution,
wherein the updated event is triggerable by user input on at least one of the first interface and the second interface;
coupling an external device to the keyboard via the second connection port;
controlling the external device using at least one of the first set of tactile keys, the second set of display-enabled tactile keys or the touch sensor; and
displaying at least one of digital content and controls corresponding to the external device, on the touch sensor.

2. The method of claim 1, wherein the first interface and second interface are contained within a display-enabled input apparatus.

3. The method of claim 2, wherein the first interface comprises at least a Liquid Crystal Display (LCD)-based touchpad.

4. The method of claim 3, wherein the LCD-based touchpad comprises at least a display element, a corresponding display controller, a touch sensor and a corresponding touch controller.

5. The method of claim 2, wherein the second interface comprises of at least one display-enabled tactile key integrated with the display-enabled input apparatus.

6. The method of claim 5, wherein the display-enabled tactile key comprises at least a tactile key, a display element, a corresponding display controller and a Complex Programmable Logic Device (CPLD) corresponding to the tactile key.

7. The method of claim 1, wherein displaying the updated adjunct visual interface content occurs (a) automatically as a result of an occurrence of at least one application event within a set of application events during application program execution; and (b) in response to user input directed to interacting with the at least one application program during application program execution.

8. The method of claim 2, further comprising selectively establishing mappings among portions within the display-enabled input apparatus, the adjunct visual interface content and the updated adjunct visual interface content in response to user input.

9. The method of claim 4, wherein user input at least one of selectively defines and selectively modifies a display location of at least a subset of at least one of the adjunct visual interface content and the updated adjunct visual interface content upon the display-enabled input apparatus.

10. The method of claim 2, further comprising displaying at least the adjunct visual interface content using a primary display apparatus simultaneously with the display of the adjunct visual interface content using the display-enabled input apparatus.

11. The method of claim 9, wherein the subset of the adjunct visual interface content is selectively defined based upon user input.

12. The method of claim 10, further comprising receiving user input corresponding to an amount of adjunct visual interface content to be displayed by the display-enabled input apparatus.

13. The method of claim 12, wherein receiving user input corresponding to an amount of adjunct visual interface content to be displayed by the display-enabled input apparatus comprises receiving user input that indicates an amount of adjunct visual interface content to be excluded from display by the primary display apparatus.

14. The method of claim 12, wherein displaying the adjunct visual interface content comprises exclusively displaying the adjunct visual interface content using the display-enabled input apparatus rather than the primary display apparatus as a result of the user input.

15. The method of claim 12, wherein displaying the adjunct visual interface content and displaying the updated adjunct visual interface content comprises exclusively displaying the adjunct visual interface content and the updated adjunct visual interface content using the display-enabled input apparatus rather than the primary display apparatus as a result of the user input.

16. The method of claim 12, wherein receiving user input corresponding to an amount of adjunct visual interface content to be displayed by the display-enabled input apparatus comprises receiving user input that indicates an amount of adjunct visual interface content that are displayed as content supplementary and/or complimentary in addition to primary visual interface content by the primary display apparatus.

17. The method of claim 16, wherein the primary visual interface content provides a portion of a first visual environment, and wherein the adjunct visual interface content includes at least one of a first remote event notification and first remotely monitored content, each of the first remote event notification and the first remotely monitored content corresponding to a second visual environment that is excluded from the first visual environment.

18. The method of claim 17, wherein adaptively displaying updated visual interface content comprises displaying at least a portion of the second visual environment as part of updated primary visual interface content using the primary display apparatus.

19. The method of claim 18, wherein adaptively displaying the updated visual interface content further comprises one of interrupting and terminating the display of the first visual environment.

20. The method of claim 19, wherein adaptively displaying the updated visual interface content input further comprises displaying second adjunct visual interface content that includes at least one of a second remote event notification that was absent from first adjunct visual interface content, second remotely monitored content that was absent from the first adjunct visual interface content, and a set of user selectable application program functions that was absent from the first adjunct visual interface content.

21. The method of claim 17, wherein each of the first visual environment and the second visual environment corresponds to an electronic game.

22. The method of claim 17, wherein the first visual environment corresponds to a first virtual geographical area having a first set of virtual geographic boundaries and the second visual environment corresponds to a second virtual geographical area having a second set of virtual geographic boundaries that is outside of the first set of virtual geographic boundaries.

23. The method of claim 17, wherein displaying the adjunct visual interface content using the display-enabled input apparatus comprises displaying a set of visual overlays using the display-enabled input apparatus rather than a primary display apparatus.

24. The method of claim 2, wherein the display-enabled input apparatus is a display-enabled keyboard which includes at least a standard set of QWERTY tactile keys.

25. The method of claim 2, wherein displaying the adjunct visual interface content using the display-enabled input apparatus during application program execution further comprises displaying controls for at least one auxiliary application being executed within a computing system.

26. The method of claim 25, wherein the at least one auxiliary application includes a media player application, a VoIP (voice over internet protocol) application, an instant messaging application, a video chat/conferencing application, an email application and an internet browser.

27. The method of claim 2, wherein displaying the adjunct visual interface content using the display-enabled input apparatus during application program execution further comprises displaying controls for a second set of apparatuses connected directly to the display-enabled input apparatus.

28. The method of claim 27, wherein the second set of apparatuses includes a media player apparatus, a digital camera, a mobile phone, a set of audio speakers, a set of audio headphones, and apparatuses which are compatible in connecting directly to the display-enabled input apparatus.

29. The method of claim 2, wherein displaying the adjunct visual interface content using the display-enabled input apparatus during application program execution further comprises displaying at least a toggle control between a set of preprogrammed events, wherein the set of pre-programmed events are triggered when at least one user input apparatus is detected to be connected to the computing system and at least one application is being run on a computing system.

30. The method of claim 29, wherein the at least one toggle control between a set of pre-programmed events include toggling between a cursor control, action sets within an application mode, application modes within an application and applications running within a computing system.

31. The method of claim 24, wherein a first set of interactions comprise a set of interactions between the first interface comprising the LCD-based touchpad and the set of QWERTY keys, and a second set of interactions comprise a set of interactions between the LCD-based touchpad of the first interface and the second interface comprising a set of display-enabled keys, wherein at least one of the first and second sets of interactions enable an adaptive displaying of the adjunct visual interface content using the display-enabled input apparatus during application program execution.

32. The method of claim 31, wherein the functions of the second set of interactions further include the controlling of the pre-programmed functions of each individual key in the set of display-enabled keys and a corresponding display within an LCD and/or OLED screen of each individual display-enabled key, upon the triggering of at least one corresponding event through the second set of interactions.

33. The method of claim 32, wherein the corresponding event includes one of an action set within a game mode or a game mode within an application, wherein the application is at least one of a FPS and MMO game.

34. The method of claim 33, wherein the corresponding event can be further toggled to and from other action sets or game modes within the application by means of at least one user input through at least one of the first and second sets of interactions.

35. The method of claim 33, wherein the first and second sets of interactions correspond to functions comprising the recording of macros and gestures in relation to specific events that can be triggered.

36. The method of claim 32, wherein the specific events include action set events within a mode of an application and mode events within an application.

37. The method of claim 36, wherein the application includes a First-Person Shooter (FPS) game or a massively multiplayer online (MMO) game.

38. A keyboard which functions as a display-enabled user input apparatus operable in conjunction with a computing system, the keyboard comprising:
   a first set of display elements of at least one display element and a corresponding first display controller;
   a second set of display elements of at least one display element and a corresponding second display controller;
   a first set of tactile keys comprising a set of QWERTY keys;
   a second set of display-enabled tactile keys, wherein each display-enabled key comprises a tactile key and a display element;
   a touch sensor and a corresponding touch sensor controller;
   a first connection port configured to connect to the computing system; and
   a second connection port configured to connect to an external device;
   wherein user input through the first set of tactile keys and second set of display-enabled tactile keys are transmitted to a corresponding Computer Programmable Logic Device (CPLD);
   wherein adjunct visual interface content is displayable by the first and second sets of display elements; and
   wherein the adjunct visual interface content on at least one of the first and second sets of display elements is updated in response to an event triggerable by the user input for execution on the computing system;
   wherein each one of the first set of tactile keys, the second set of display-enabled tactile keys or the touch sensor is configured to control the external device; and
   wherein the touch sensor is further configured to display at least one of digital content and controls corresponding to the external device.

39. The keyboard of claim 38, wherein the first set of display elements comprises one display element.

40. The keyboard of claim 39, wherein an LCD-based touchpad comprises the display element and the display controller, touch sensor and the touch controller.

41. The keyboard of claim 40, wherein the LCD-based touchpad includes one of a capacitive or resistive touchscreen.

42. The keyboard of claim 40, wherein the LCD-based touchpad includes a trackpad.

43. The keyboard of claim 38, wherein the display element of each display-enabled tactile key comprises one of an LCD or an OLED.

44. The keyboard of claim 38, wherein the set of display-enabled tactile keys comprise optically transmissive or transparent display windows, which are offset from or disposed above a display surface such as an LCD or OLED display screen in a manner that enables the transmission of visual signals from portions of the display screen through the display window of any given key or button.

45. The keyboard of claim 38, wherein the keyboard is a display-enabled keyboard.

46. The keyboard of claim 38, wherein the keyboard has at least one of a set of USB ports and a set of audio output ports, wherein the set of USB ports comprise at least one USB port and the set of audio output ports has at least one audio output port.

47. The method of claim 1, further comprising at least one of controlling the display of and functioning as a display for the bypass secondary apparatus through at least one of the first interface and second interface.

48. The method of claim 1, wherein the updated event is triggerable by the bypass secondary apparatus.

49. The method of claim 1, wherein the updated event is automatically triggered by the application program.

50. The method of claim 1, wherein the external device is one of a media player device, a digital camera, a mobile phone, a set of audio speakers or headphones.

51. The method of claim 1, wherein the external device is configured to bypass the computing system.

52. The method of claim 1, further comprising displaying controls for a further application program running on the computing system, using at least one of the first interface or the second interface.

* * * * *